United States Patent
Kim (10) Patent No.: US 12,157,398 B2
(45) Date of Patent: Dec. 3, 2024

(54) VEHICLE AND CONTROL METHOD THEREOF

(71) Applicants: HYUNDAI MOTOR COMPANY, Seoul (KR); KIA MOTORS CORPORATION, Seoul (KR)

(72) Inventor: Byung Gil Kim, Incheon (KR)

(73) Assignees: HYUNDAI MOTOR COMPANY, Seoul (KR); KIA MOTOR CORPORATION, Seoul (KR)

( * ) Notice: Subject to any disclaimer, the term of this patent is extended or adjusted under 35 U.S.C. 154(b) by 802 days.

(21) Appl. No.: 17/099,284

(22) Filed: Nov. 16, 2020

(65) Prior Publication Data

US 2022/0009355 A1 Jan. 13, 2022

(30) Foreign Application Priority Data

Jul. 7, 2020 (KR) .................. 10-2020-0083649

(51) Int. Cl.
*B60L 7/18* (2006.01)

(52) U.S. Cl.
CPC ........... *B60L 7/18* (2013.01); *B60L 2240/545* (2013.01); *B60L 2240/642* (2013.01); *B60L 2250/16* (2013.01)

(58) Field of Classification Search
CPC ............... B60L 7/18; B60L 2240/545; B60L 2240/642; B60L 2250/16; B60L 53/66; B60L 53/68; B60L 2240/12; B60L 58/12; B60L 7/10; Y02T 10/70; Y02T 10/7072; Y02T 10/72; Y02T 90/12; Y02T 90/16;

(Continued)

(56) References Cited

U.S. PATENT DOCUMENTS

| 10,457,271 B2 * | 10/2019 | Perkins ................. B60W 10/30 |
| 2008/0183348 A1 * | 7/2008 | Arita ................. B60W 50/0097 701/22 |

(Continued)

FOREIGN PATENT DOCUMENTS

KR 10-2019-0068285 A 6/2019

OTHER PUBLICATIONS

Zhang Xiangwen, "Electric automobile braking control strategy based on road surface identification" (ip.com machine translation of CN 111469670), Apr. 14, 2020, ip.com machine translation (Year: 2020).*

*Primary Examiner* — Christopher W Carter
(74) *Attorney, Agent, or Firm* — Lempia Summerfield Katz LLC (57) ABSTRACT

The present disclosure to provides a vehicle capable of efficiently charging electric energy by determining a regenerative braking control improved for a driving situation in which the vehicle is driving, and a control method thereof. The vehicle includes: a power supply including a battery; a motor driven by receiving power from the battery; and a controller configured to determine a vehicle information including a charging state information of the battery, a temperature information of the battery, an input frequency of a braking command, and a driving history data, to determine a road information including a road condition information and a slope information of the road, to charge the battery by determining a regenerative braking level of the motor based on the vehicle information or the road information.

14 Claims, 7 Drawing Sheets

(58) Field of Classification Search
CPC ....... Y02T 90/167; Y04S 30/12; B60K 35/00; B60K 2370/152; B60T 13/74; B60T 2270/60; B60W 10/26; B60W 30/18127; B60W 40/06; B60W 2050/146; B60W 2552/15; B60W 2556/45; B60Y 2200/91; B60Y 2300/18125

See application file for complete search history.

(56) References Cited

U.S. PATENT DOCUMENTS

| | | | |
|---|---|---|---|
| 2012/0179347 A1* | 7/2012 | Aldighieri | B60T 17/22 |
| | | | 701/70 |
| 2014/0149010 A1* | 5/2014 | Li | B60L 15/2045 |
| | | | 701/70 |
| 2018/0079304 A1* | 3/2018 | Koebler | B60T 7/22 |
| 2018/0215272 A1* | 8/2018 | Vitullo | B60L 7/18 |
| 2019/0071068 A1* | 3/2019 | Shin | B60W 20/12 |
| 2019/0176827 A1* | 6/2019 | Han | B60W 50/0097 |
| 2019/0212161 A1* | 7/2019 | Pedersen | B60L 58/12 |
| 2020/0307384 A1* | 10/2020 | Mendez Pineda | B60L 58/12 |

* cited by examiner

VEHICLE AND CONTROL METHOD THEREOF

CROSS-REFERENCE TO RELATED APPLICATION

The present application claims priority to and the benefit of Korean Patent Application No. 10-2020-0083649, filed on Jul. 7, 2020, the entire contents of which are incorporated herein by reference.

FIELD

The disclosure relates to a vehicle that performs regenerative braking using electric energy and a control method thereof.

BACKGROUND

The most basic way to improve fuel economy when driving a vehicle is to reduce acceleration and braking.

In the case of an electric vehicle, since it has a motor, it is possible to recover energy during braking.

Electric vehicle may use a motor as a generator during braking to convert kinetic energy into electric energy, and reduce the speed while charging the battery.

When coasting with your foot off the accelerator pedal, electric vehicle can adjust the deceleration rate by controlling the degree of regeneration. At this time, the degree of regeneration is called the regenerative braking level.

Electric vehicles regenerate kinetic energy during braking, so they have higher energy efficiency than internal combustion engine vehicles, but even so, if driving and regeneration are unnecessarily repeated, the overall energy efficiency decreases due to inverter, motor, and battery efficiency.

Therefore, we have discovered ways to improve the efficiency of regenerative braking of electric vehicles by determining the regenerative braking level according to the situation.

SUMMARY

The present disclosure provides a vehicle capable of efficiently charging electric energy by determining a regenerative braking control improved for a driving situation in which the vehicle is driving, and a control method thereof.

In accordance with one aspect of the disclosure, a vehicle includes: a power supply including a battery; a motor driven by receiving power from the battery; and a controller configured to determine a vehicle information including a charging state information of the battery, a temperature information of the battery, an input frequency of a braking command, and a driving history data, to determine a road information including a road condition information and a slope information of the road, and to charge the battery by determining a regenerative braking level of the motor based on the vehicle information, or the road information.

The vehicle may further include: a brake; a transceiver configured to communicate with a server; an input device configured to receive the braking command; and a sensor configured to obtain an input frequency of the braking command, and the controller may be configured to charge the battery by determining the regenerative braking level of the motor based on the data received from the server and the input frequency of the braking command.

The transceiver may be configured to communicate with the server configured to store the driving history data of a user, and the controller may be configured to charge the battery by determining the regenerative braking level of the motor based on the driving history data.

The controller may be configured to receive a road condition information on which the vehicle is driving from the server and charge the battery by determining the road condition information and the regenerative braking level of the motor.

The controller may be configured to charge the battery by determining the regenerative braking level of the motor based on the charging state information of the battery.

The controller may be configured to obtain a slope information of the road on which the vehicle is driving from the server and charge the battery by determining the regenerative braking level of the motor based on the slope information of the road.

The controller may be configured to obtain a temperature information of the battery and charge the battery by determining the regenerative braking level of the motor based on the temperature information.

The vehicle may further include: a display, and the controller may be configured to output the determined regenerative braking level to the display.

In accordance with another aspect of the disclosure, a control method of a vehicle includes: driving a motor by receiving power from a battery; determining a vehicle information including a charging state information of the battery, a temperature information of the battery, an input frequency of a braking command, and a driving history data; determining a road information including a road condition information and a slope information of the road; and charging the battery by determining a regenerative braking level of the motor based on the vehicle information, or the road information.

The control method may further include: communicating with a server; receiving the braking command; and obtaining an input frequency of the braking command, and the charging the battery may include: charging the battery by determining the regenerative braking level of the motor based on the data received from the server and the input frequency of the braking command.

The communicating with the server may include: communicating with the server configured to store the driving history data of a user, and the charging the battery may include: charging the battery by determining the regenerative braking level of the motor based on the driving history data.

The communicating with the server may include: receiving a road condition information on which the vehicle is driving from the server, and the charging the battery may include: charging the battery by determining the road condition information and the regenerative braking level of the motor.

The charging the battery may include: charging the battery by determining the regenerative braking level of the motor based on the charging state information of the battery.

The charging the battery may include: obtaining a slope information of the road on which the vehicle is driving from the server; and charging the battery by determining the regenerative braking level of the motor based on the slope information of the road.

The charging the battery may include: obtaining a temperature information of the battery; and charging the battery by determining the regenerative braking level of the motor based on the temperature information.

The control method may further include: outputting the determined regenerative braking level to the display.

BRIEF DESCRIPTION OF THE DRAWINGS

These and/or other aspects of the disclosure will become apparent and more readily appreciated from the following description of the forms, taken in conjunction with the accompanying drawings of which.

DETAILED DESCRIPTION

Like numerals refer to like elements throughout the specification. Not all elements of various forms of the present disclosure will be described, and description of what are commonly known in the art or what overlap each other in the forms will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, identify the presence of stated features, integers, steps, operations, elements, and/or components, but do not preclude the presence or addition of one or more other features, integers, steps, operations, elements, components, and/or groups thereof, unless the context clearly indicates otherwise.

In the specification, it will be understood that, when a member is referred to as being "on/under" another member, it can be directly on/under the other member, or one or more intervening members may also be present.

The terms including ordinal numbers like "first" and "second" may be used to explain various components, but the components are not limited by the terms. The terms are only for the purpose of distinguishing a component from another.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the operating principles and various forms of the present disclosure will be described with reference to the accompanying drawings.

Figure 1:
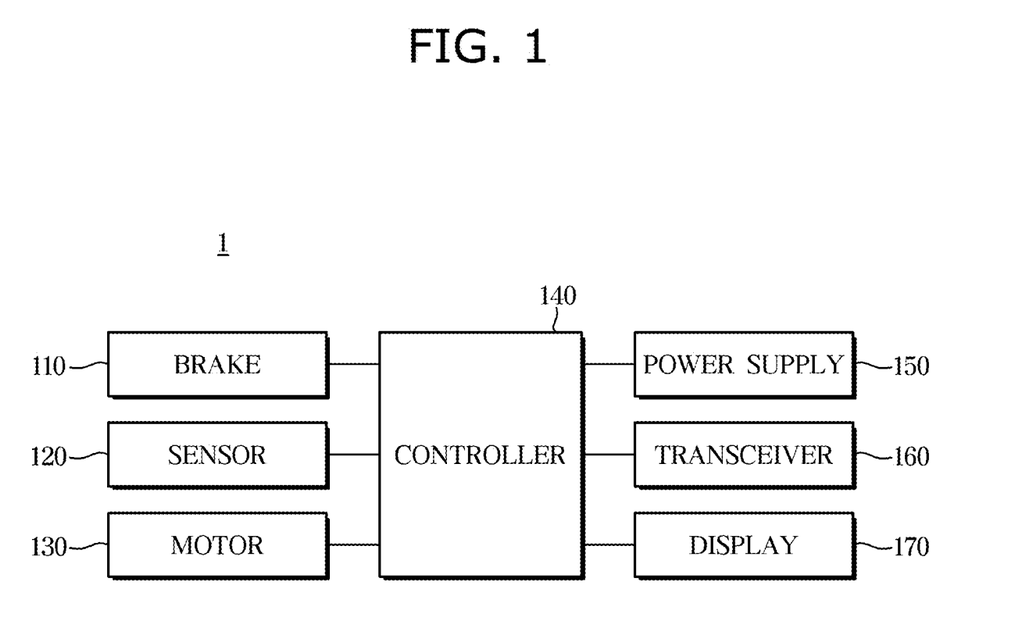
FIG. 1 is a control block diagram of a vehicle according to one form of the present disclosure.

FIG. 1 is a control block diagram of a vehicle according to one form of the present disclosure.

A vehicle 1 according to one form of the present disclosure may include a transceiver 160, a brake 110, a motor 130, a power supply 150, an input device, a sensor 120, and a controller 140.

The transceiver 160 may be provided as a module capable of communicating with an external device.

Specifically, the transceiver 160 may communicate with an external server to transmit and receive data, and may obtain vehicle location information by receiving a GPS signal.

The transceiver 160 may include one or more components that enable communication with an external device, and may include, for example, at least one of a short-range communication module, a wired communication module, and a wireless communication module.

The brake 110 may be provided in a configuration to brake the vehicle. Specifically, the brake 110 may include a disk and inner and outer disk pads that are movably installed on a carrier (not shown) coupled to a vehicle body so as to be compressed on the inner/outer surfaces of the disk and a caliper.

The motor 130 may refer to a configuration that receives power from the power supply 150 and drives the vehicle.

The power supply 150 may be provided as a configuration that stores energy. According to one form of the present disclosure, the battery may be provided as an Energy Storage System (ESS).

The input device may be provided as a configuration for inputting a braking command for braking the motor 130 through the user's brake 110. Specifically, the input device may be provided as a brake pedal provided on a vehicle.

The sensor 120 may obtain information on a braking command input by a user. Specifically, the sensor 120 may obtain the input frequency of the braking command.

The controller 140 may charge the battery by determining the regenerative braking level of the motor based on vehicle information, or road information.

The vehicle information is information related to the vehicle itself and may include charging state information of a battery, temperature information of a battery, an input frequency of a braking command, and driving history data.

Meanwhile, the road information is information related to a road on which the vehicle is driving and may include road condition information and road slope information.

The controller 140 may charge the motor 130 by determining the regenerative braking level of the motor 130 based on the data received from the server and the input frequency of the braking command.

The data received from the server may include road condition information, driving history information of a user, and the like, as described later.

Meanwhile, the transceiver 160 according to one form of the present disclosure may communicate with a server that stores driving history data of a user.

The driving history data may mean data including the tendency of a driver driving a vehicle. The drivers driving tendency may include the frequency of operation of the brake pedal.

The controller 140 may charge the battery by determining a regenerative braking level of the motor 130 based on driving history data.

The controller 140 may charge the battery by receiving road condition information on which the vehicle is driving from the server, determining road condition information and regenerative braking level of the motor 130.

Road condition information may mean traffic condition information such as traffic jams on the road the vehicle is driving.

The controller 140 may charge the battery by determining the regenerative braking level of the motor 130 based on the charging state information of the power supply 150.

The controller 140 may charge the battery by obtaining slope information of a road on which the vehicle is driving from a server, and determining a regenerative braking level of the motor 130 based on the slope information of the road.

The controller 140 may charge the battery by obtaining temperature information of the power supply 150 and determining a regenerative braking level of the motor 130 based on the temperature information.

Meanwhile, the power supply 150 may be provided in a configuration that supplies power including a battery, and the charging state information may mean information related to the amount of charge of the battery.

The temperature information of the power supply 150 may mean the temperature of the battery described above.

A vehicle according to one form of the present disclosure may further include a display 170.

The display 170 may include a cathode ray tube (CRT), a digital light processing (DLP) panel, a plasma display panel, a liquid crystal display (LCD) panel, and an electroluminescent (EL) panel, electrophoretic display (EPD) panel, electrochromic display (ECD) panel, light emitting diode (LED) panel, or organic light emitting diode (OLED), but is not limited thereto.

The display 170 may refer to a cluster provided in a vehicle or may refer to a device provided in an audio video navigation (AVN) device.

The controller 140 may output the determined regenerative braking level to the display 170.

Figure 2:
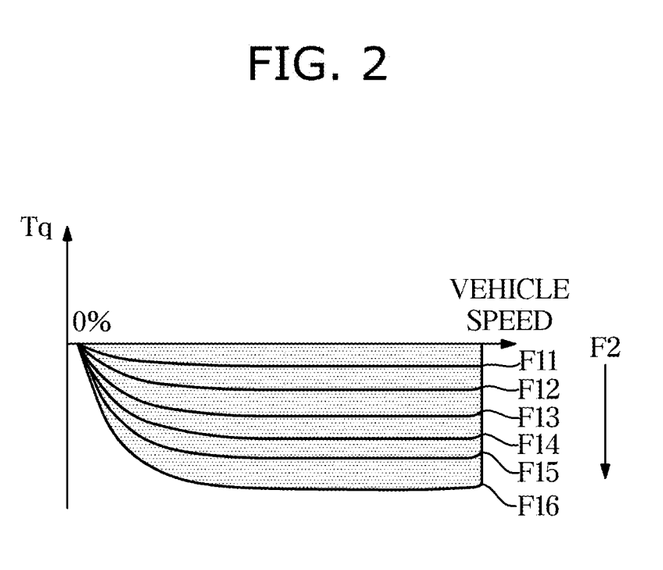
FIG. 2 is a graph for illustrating an operation of determining a regenerative braking level based on an input frequency of a braking command according to one form of the present disclosure.

FIG. 2 is a graph for illustrating an operation of determining a regenerative braking level based on an input frequency of a braking command according to one form of the present disclosure.

Referring to FIG. 2, the controller 140 according to one form of the present disclosure may receive a command from a user for improving the regenerative braking operation.

Meanwhile, the vehicle and the server communicate with each other to store the driving tendency of the usual user in the server.

Meanwhile, the controller 140 may call driving history data including driving tendency when the system is activated.

Specifically, the controller 140 may determine the regenerative braking level according to the number of brake pedal frequencies for the user's driving tendency.

In FIG. 2, it may mean that the regenerative braking level is higher as progressing in the F2 direction.

Specifically, referring to FIG. 2, the X axis may denote a vehicle speed and the Y axis may denote a torque value applied for regenerative braking.

In addition, F11 to F16 may mean a relationship between vehicle speed and torque corresponding to the frequency of operation of the user's brake pedal.

It may mean that the frequency of the driver's brake pedal operation is more frequent as it goes toward F2.

The controller 140 may determine the driver's driving tendency as a tendency to frequently perform coasting when the frequency of operating the brake pedal is low.

Frequent coasting means that the driver depends on the inertia in driving the vehicle, and frequent coasting may be interpreted as having a low input frequency of the driver's driving command.

In this case, the controller 140 may increase the regenerative braking level as the frequency of operation of the brake pedal increases, and thus determine a deceleration sufficient to enable one-pedal driving.

On the other hand, when the frequency of operation of the brake pedal is low, the controller 140 may determine that the driver has a tendency to perform a coasting.

In this case, the controller 140 may adjust the regenerative braking level to a low value.

In more detail, the controller 140 may determine a deceleration of a degree close to zero by lowering the regenerative braking level as the frequency of operating the brake pedal is lower.

Based on the above-described operation, drivers with frequent coasting tend to reduce undesired deceleration, thereby preventing a decrease in efficiency due to re-acceleration after deceleration, and a user with a tendency to operate the brake pedal frequently may achieve sufficient deceleration without stepping on the brake pedal, thus reducing hydraulic braking caused by brake pedal operation, thus improving energy efficiency.

Meanwhile, the operation described in FIG. 2 is only one form of the present disclosure, and there is no limitation on the operation of determining the regenerative braking level based on the driver's tendency.

Figure 3:
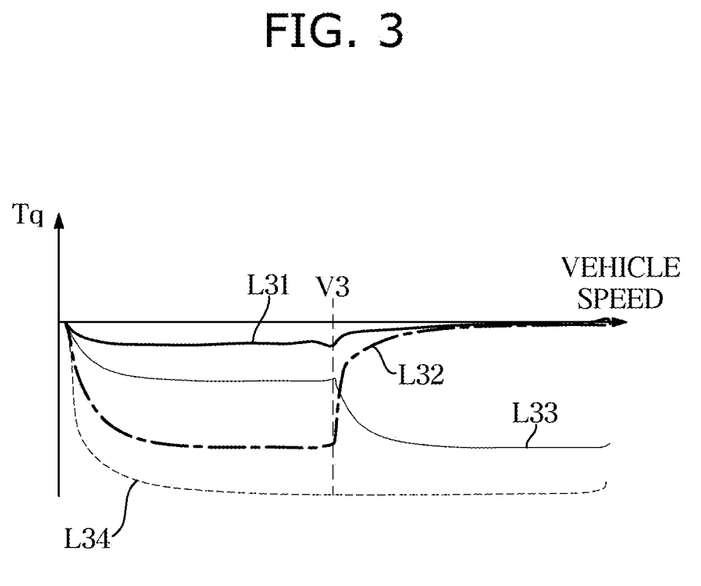
FIG. 3 is a graph for illustrating an operation of determining a regenerative braking level based on road condition information according to one form of the present disclosure.

FIG. 3 is a graph for illustrating an operation of determining a regenerative braking level based on road condition information according to one form of the present disclosure.

The road condition information may include the type of road the vehicle is driving and the degree of traffic jam of the road.

Specifically, the vehicle may receive a GPS signal, and the server may determine the road on which the vehicle is driving based on the GPS signal.

Based on this, the server may determine whether the road the vehicle is driving is a highway or a city road.

In addition, the server may determine whether the traffic volume of the road the vehicle is driving is large or small.

Referring to FIG. 3, the X axis may denote a vehicle speed and the Y axis may denote a torque value applied for regenerative braking.

Meanwhile, a large absolute value of torque may mean a high regenerative braking level.

L31 represents the torque corresponding to the vehicle speed when the vehicle travels on a highway and there is no traffic jam.

Referring to L31, since deceleration is not desired in the high speed region of v3 or higher, the controller 140 may determine the regenerative braking level of the high speed region to be close to zero.

On the other hand, the controller may maintain a low level of regenerative braking level in the low-speed region at speeds below v3.

L32 Shows the torque corresponding to the vehicle speed when driving on a highway and there is traffic jam.

Referring to L32, when driving on the highway and there is traffic jam, the controller 140 controls the regenerative braking level to be large enough to enable driving with only one pedal because vehicle drives at low speeds in traffic jam sections corresponding to speeds below v3. The controller 140 may control the regenerative braking level to be sharply small in a high-speed section so that it is easy to perform instantaneous acceleration at a speed greater than or equal to v3 at which traffic jam is released.

In L33, when the vehicle is driving on a city road and there is no city traffic jam, the torque corresponding to the vehicle speed is shown.

On the other hand, when the vehicle is driving on a city road and there is no traffic jam in the city (L33), the controller 140 may control the regenerative braking level to a general regenerative braking level at the average speed and low to medium speeds in the city. On the other hand, in the high-speed region with a speed of v3 or higher, it is possible to induce deceleration by increasing the regenerative braking level in consideration of the safety of city driving.

L34 shows the torque corresponding to the vehicle speed when the vehicle is driving on a city road and there is a traffic jam in the city.

Meanwhile, when the vehicle is in a traffic jam in the city (L34), the controller 140 has a very large regenerative braking level in most areas, and may provide convenience by enabling driving with only one pedal.

Meanwhile, as described in FIG. 3, the operation of determining the regenerative braking level including the type of road and whether there is a traffic jam is presented in the road information, but the road information is not limited as long as it is information on the road on which the vehicle is driving.

Figure 4:
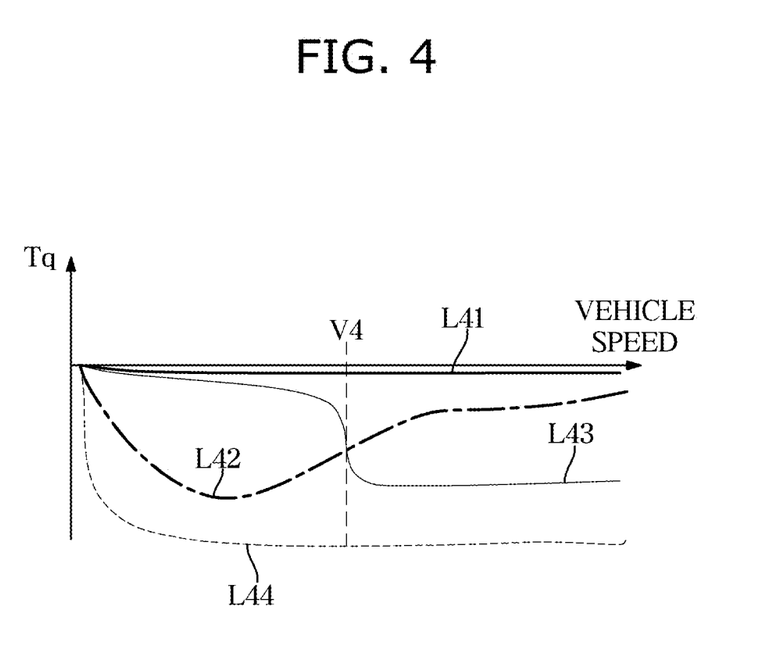
FIG. 4 is a graph for illustrating an operation of determining a regenerative braking level based on slope information of a road and charging state information of a battery according to one form of the present disclosure.

FIG. 4 is a graph for illustrating an operation of determining a regenerative braking level based on slope information of a road and charging state information of a battery according to one form of the present disclosure.

Referring to FIG. 4, the X axis may denote a vehicle speed and the Y axis may denote a torque value applied for regenerative braking.

Meanwhile, a large absolute value of torque may mean a high regenerative braking level.

The vehicle may receive road slope information from the server.

Road slope information may mean information including a slope of a road on which the vehicle is driving. The vehicle may determine whether the road the vehicle is driving is an uphill or downhill road using road slope information, and if it is determined as an uphill or downhill road, it may also determine the angle of the corresponding road.

In addition, the controller 140 may receive charging state information of the power supply 150.

The charging state information of the power supply 150 may include whether the battery provided in the power supply 150 is in a fully charged state or a discharged state, and may specifically include power that may be supplied by the power supply 150.

L41 represents the torque corresponding to the vehicle speed when the vehicle drives uphill and the charging capacity of the battery is higher than the predetermined reference output voltage.

The predetermined reference output voltage is an arbitrary value predetermined by the user, and it may be determined differently according to the type of vehicle. Specifically, when the vehicle is driving uphill and the charging capacity of the battery is high (L41), the controller 140 may reduce charging by keeping the regenerative braking level small because regeneration should be reduced.

L42 represents the torque corresponding to the vehicle speed when the vehicle drives uphill and the charging capacity of the battery is lower than the predetermined reference output voltage.

In this case, since the vehicle needs to be charged, regenerative energy must be secured, and undesired regenerative/driving repetitions must be avoided. Thus, based on the speed of v4, the regenerative braking level may be kept large at low speeds and small at high speeds.

L43 represents the torque corresponding to the vehicle speed when the vehicle travels downhill and the charging capacity of the battery is higher than the predetermined reference output voltage. In this case, the controller induces hydraulic braking by reducing the regenerative braking level as much as possible. If the regenerative braking level is set to be small in the high-speed region of v4 or higher, the vehicle performs sliding and the stability of the driving itself decreases, thereby determining the regenerative braking level to be larger. That is, the controller can determine the regenerative braking level to be larger in the high-speed region of v4 or higher compared to that in the low-speed region.

L44 represents the torque corresponding to the vehicle speed when the vehicle is in a downhill state where the charging capacity of the battery is higher than the predetermined reference output voltage.

In this case, the controller needs to secure downhill stability and regenerative energy as much as possible, so it may maintain a large regenerative braking level in all areas.

Meanwhile, the operation of determining the regenerative braking level based on the slope of the road and the capacity of the power supply 150 described in FIG. 4 is only one form of the present disclosure, and there is no limitation on the operation of determining the regenerative braking level based on this.

Figure 5:
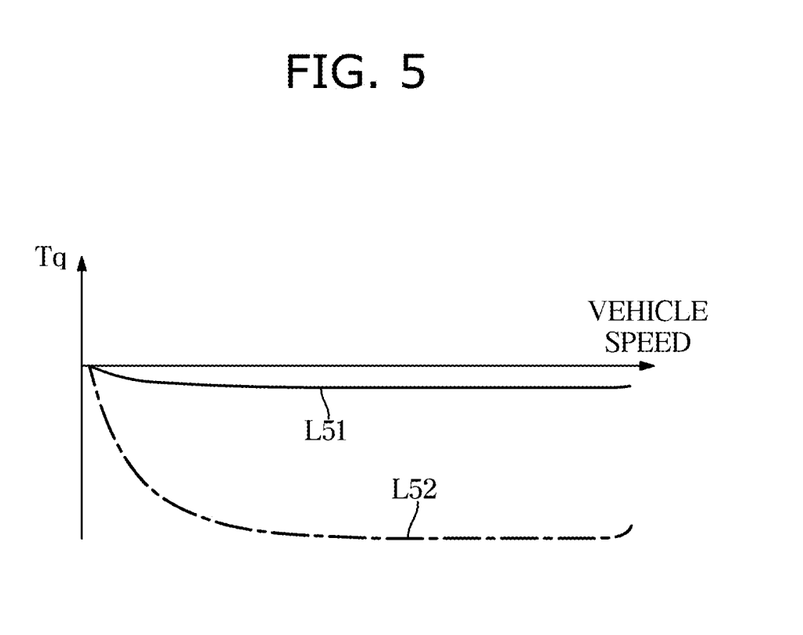
FIG. 5 is a diagram for illustrating an operation of determining a regenerative braking level of the motor based on temperature information according to one form of the present disclosure.

FIG. 5 is a diagram for illustrating an operation of determining a regenerative braking level of the motor based on temperature information according to one form of the present disclosure.

Referring to FIG. 5, the X axis may denote a vehicle speed and the Y axis may denote a torque value applied for regenerative braking.

Meanwhile, a large absolute value of torque may mean a high regenerative braking level.

The temperature information of the power supply 150 may mean the temperature of a battery included in the power supply 150.

L51 represents the torque corresponding to the vehicle speed when the battery temperature included in the vehicle is high (L51).

When the battery temperature included in the vehicle is high (L51), there is no need to keep the battery temperature high by frequent regeneration. The controller 140 may induce hydraulic braking as much as possible by reducing the regenerative braking level and reducing regeneration.

L52 represents the torque corresponding to the vehicle speed when the battery temperature included in the vehicle is low (L52).

When the battery temperature included in the vehicle is low (L52), and when it is desired to increase the battery temperature, the controller 140 may increase the regenerative braking level to frequently perform regeneration.

When regeneration is frequently performed based on the control of the controller 140, the temperature of the battery increases, so that a temperature increase effect can be seen.

Figure 6:
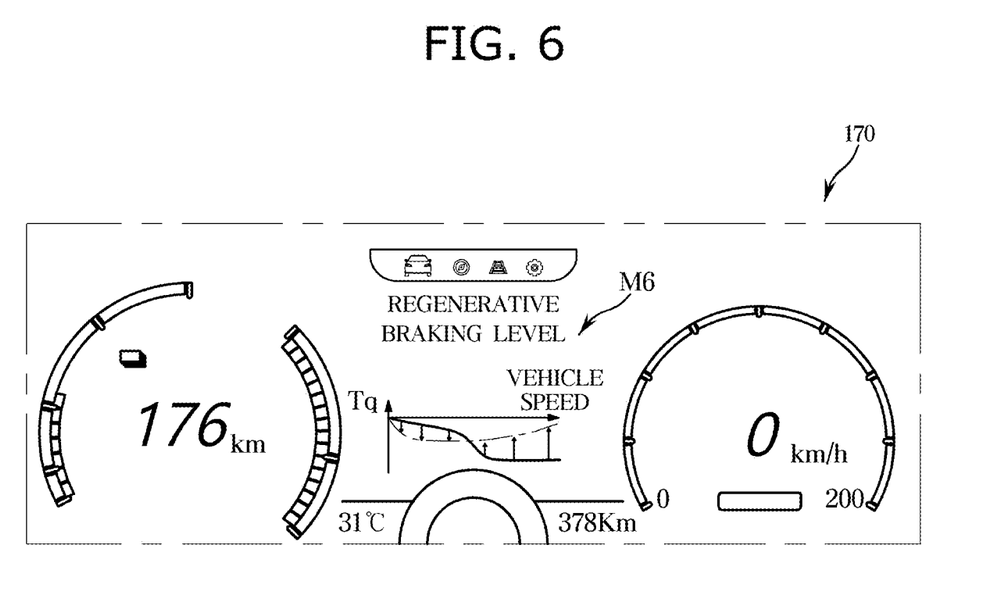
FIG. 6 is a diagram for illustrating an operation of outputting a regenerative braking level to a display according to one form of the present disclosure.

FIG. 6 is a diagram for illustrating an operation of outputting a regenerative braking level to a display according to one form of the present disclosure.

Based on the above-described operation, the controller 140 may determine the regenerative braking level.

The controller 140 may output the regenerative braking level M6 set as a result of calculating the regenerative braking level to the displays 170.

In FIG. 6, the regenerative braking level M6 may be output to the display 170 provided in the cluster of the vehicle.

Meanwhile, the regenerative braking level may be output as a graph expressed as torque according to speed.

Meanwhile, the torque of the present specification may mean a creep torque in which a certain amount of torque is input in a direction opposite to the progress of the vehicle when braking is performed while driving.

In addition, in FIG. 6, both the regenerative braking level itself and the regenerative braking level changed in the future may be output to the display 170.

Specifically, the controller 140 may indicate to what extent the regenerative braking level is currently applied by providing the regenerative braking value to the driver through the display 170.

In addition, the controller 140 provides by updating the regenerative braking level value again according to the current tendency when driving differently from the stored driving tendency.

Meanwhile, the form of providing the regenerative braking level in the display 170 shown in FIG. 6 is only an example of the present disclosure, and the regenerative braking level may be transmitted to the driver in various forms.

Figure 7:
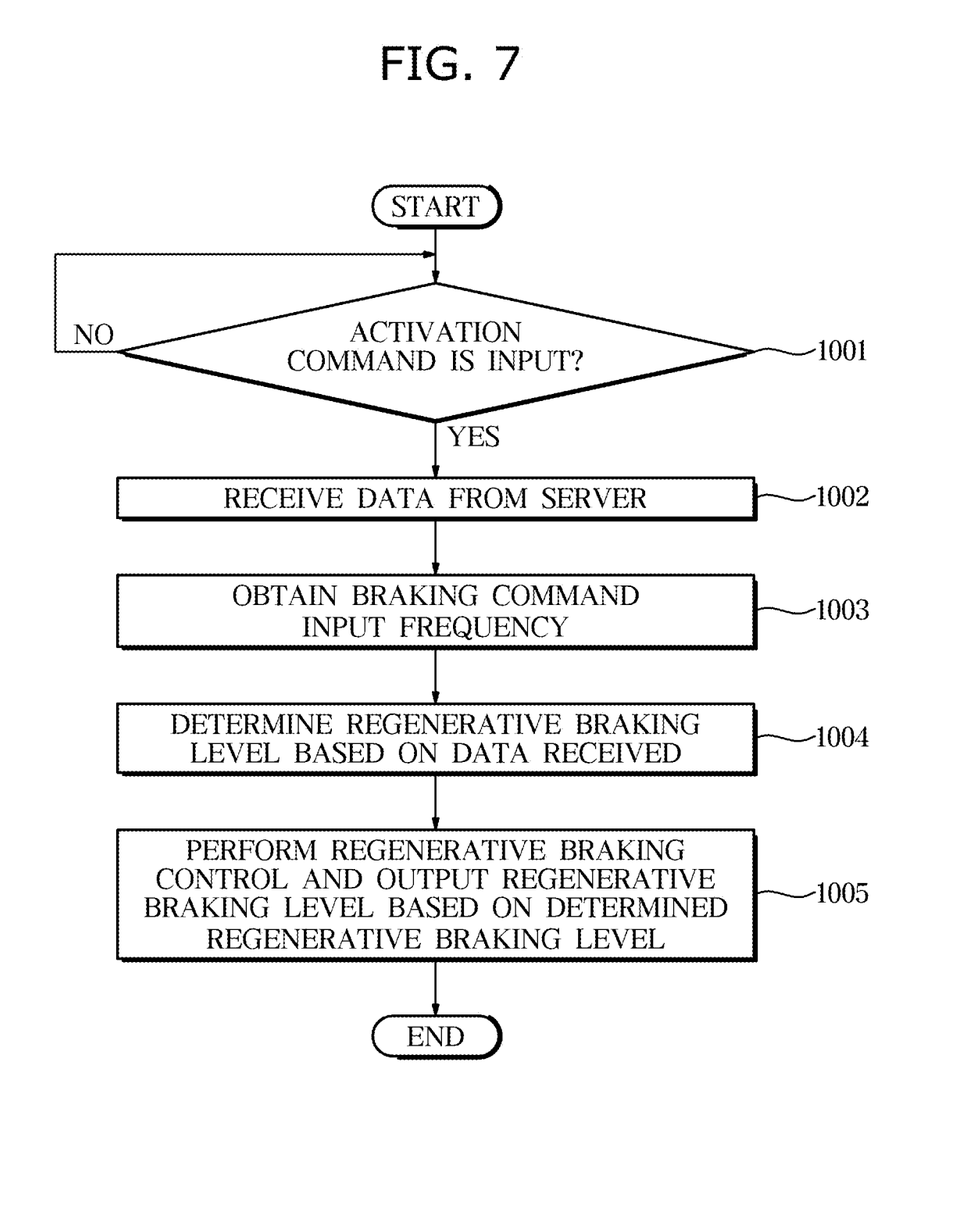
FIG. 7 is a flow chart according to one form of the present disclosure.

FIG. 7 is a flow chart according to one form of the present disclosure.

Referring to FIG. 7, the vehicle may determine whether to input an activation command that determines the regenerative braking level by reflecting the drivers driving tendency (1001).

In addition, when a user's activation command is input, the controller 140 may receive data from the server (1002).

Meanwhile, the data received by the server may include driving history data, road condition information, and road slope information, as described above.

In addition, the controller 140 may obtain a braking command input frequency input by a user through an input device (1003).

The controller 140 may determine the regenerative braking level based on the data obtained by the server and the obtained braking command input frequency (1004).

Based on the above-described operation, the controller 140 may perform regenerative braking control and output the regenerative braking level based on the determined regenerative braking level (1005).

Meanwhile, the disclosed forms may be embodied in the form of a recording medium storing instructions executable by a computer. The instructions may be stored in the form of program code and, when executed by a processor, may generate a program module to perform the operations of the disclosed forms. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

Although exemplary forms of the disclosure have been described for illustrative purposes, those skilled in the art will appreciate that various modifications, additions and substitutions are possible, without departing from the scope and spirit of the disclosure. Therefore, exemplary forms of the disclosure have not been described for limiting purposes.

The vehicle and control method thereof according to one form of the present disclosure can efficiently charge electric energy by determining regenerative braking control improved for a driving situation in which the vehicle is driving.

What is claimed is:

1. A vehicle comprising:
a power supply comprising a battery;
a transceiver configured to communicate with a server;
a motor configured to be driven by power received from the battery;
a controller configured to:
determine vehicle information and road information, and
charge the battery by determining a regenerative braking level of the motor based on the vehicle information or the road information;
a brake;
an input device configured to receive a braking command; and
a sensor configured to obtain an input frequency of the braking command,
wherein the vehicle information comprises charging state information of the battery, temperature information of the battery, the input frequency of the braking command, and driving history data,
wherein the road information comprises a road condition information and a slope information of a road,
wherein the road condition information further comprises a type of the road,
wherein the controller is configured to:
receive the road condition information of the road on which the vehicle is driving based on global positioning system (GPS) from the server,
determine the regenerative braking level of the motor based on the input frequency of the braking command and data received from the server, and
charge the battery based on the determined regenerative braking level of the motor,
wherein the server is configured to determine a traffic volume of the road on which the vehicle is driving based on the road information, and
wherein the server is configured to determine whether the type of road on which the vehicle is driving is a highway or a city road.

2. The vehicle according to claim 1, wherein:
the transceiver is configured to communicate with the server configured to store the driving history data of a user, and
the controller is further configured to charge the battery by determining the regenerative braking level of the motor based on the driving history data.

3. The vehicle according to claim 1, wherein the controller is configured to charge the battery by determining the road condition information and the regenerative braking level of the motor.

4. The vehicle according to claim 1, wherein the controller is configured to obtain a slope information of the road on which the vehicle is driving from the server and to charge the battery by determining the regenerative braking level of the motor based on the slope information of the road.

5. The vehicle according to claim 1, wherein the controller is configured to charge the battery by determining the regenerative braking level of the motor based on the charging state information of the battery.

6. The vehicle according to claim 1, wherein the controller is configured to obtain a temperature information of the battery and to charge the battery by determining the regenerative braking level of the motor based on the temperature information.

7. The vehicle according to claim 1, wherein the vehicle further comprises:
a display,
wherein the controller is configured to output the determined regenerative braking level to the display.

8. A control method of a vehicle, comprising:
driving a motor with power received from a battery;
communicating with a server;
determining vehicle information comprising charging state information of the battery, temperature information of the battery, an input frequency of a braking command, and driving history data;
receiving the braking command;
obtaining the input frequency of the braking command;
determining road information comprising a road condition information and slope information of a road; and
charging the battery by determining a regenerative braking level of the motor based on the vehicle information, or the road information;
determining the regenerative braking level of the motor based on the input frequency of the braking command and data received from the server; and
charging the battery based on the determined regenerative braking level of the motor,
wherein the road condition information further comprises a type of the road,
wherein a controller is configured to receive the road condition information of the road on which the vehicle is driving based on global positioning system from the server,
wherein the server is configured to determine a traffic volume of the road on which the vehicle is driving based on the road information, and
wherein the server is configured to determine whether the type of road on which the vehicle is driving is a highway or a city road.

9. The control method according to claim 8, wherein communicating with the server comprises communicating with the server configured to store the driving history data of a user, and
wherein the charging the battery further comprises determining the regenerative braking level of the motor based on the driving history data.

10. The control method according to claim 8, wherein charging the battery comprises determining the road condition information and the regenerative braking level of the motor.

11. The control method according to claim 8, wherein charging the battery comprises:
obtaining a slope information of the road on which the vehicle is driving from the server; and
charging the battery by determining the regenerative braking level of the motor based on the slope information of the road.

12. The control method according to claim 8, wherein charging the battery comprises determining the regenerative braking level of the motor based on the charging state information of the battery.

13. The control method according to claim 8, wherein charging the battery comprises:
obtaining temperature information of the battery; and
determining the regenerative braking level of the motor based on the temperature information.

14. The control method according to claim 8, where in the control method further comprises outputting the determined regenerative braking level to a display.

* * * * *